United States Patent
Hammond et al.

(10) Patent No.: US 11,415,744 B1
(45) Date of Patent: Aug. 16, 2022

(54) PERFORATED WAVELENGTH-DIVISION MULTIPLEXING FILTERS

(71) Applicant: GLOBALFOUNDRIES U.S. Inc., Santa Clara, CA (US)

(72) Inventors: Alec Hammond, Atlanta, GA (US); Yusheng Bian, Ballston Lake, NY (US); Michal Rakowski, Ballston Lake, NY (US); Won Suk Lee, Malta, NY (US); Asif J. Chowdhury, Clifton Park, NY (US); Roderick A. Augur, Saratoga Springs, NY (US); Abdelsalam Aboketaf, Essex Junction, VT (US)

(73) Assignee: GlobalFoundries U.S. Inc., Santa Clara, CA (US)

( * ) Notice: Subject to any disclaimer, the term of this patent is extended or adjusted under 35 U.S.C. 154(b) by 0 days.

(21) Appl. No.: 17/170,203

(22) Filed: Feb. 8, 2021

(51) Int. Cl.
*G02B 6/293* (2006.01)
*G02B 6/12* (2006.01)
*G02B 6/13* (2006.01)
*G02B 1/00* (2006.01)

(52) U.S. Cl.
CPC ......... *G02B 6/12007* (2013.01); *G02B 1/002* (2013.01); *G02B 6/13* (2013.01); *G02B 6/2938* (2013.01); *G02B 6/29355* (2013.01); *G02B 2006/12061* (2013.01)

(58) Field of Classification Search
None
See application file for complete search history.

(56) References Cited

U.S. PATENT DOCUMENTS

| | | | | |
|---|---|---|---|---|
| 7,082,235 | B2* | 7/2006 | Gunn, III | G02B 6/1228 385/28 |
| 2003/0185532 | A1* | 10/2003 | Hosomi | G02B 6/1225 385/129 |
| 2008/0159679 | A1* | 7/2008 | Sigalas | G02B 6/1225 385/2 |
| 2011/0205617 | A1* | 8/2011 | Iizuka | G02B 6/1225 359/322 |
| 2019/0339670 | A1* | 11/2019 | Tang | G05B 19/4099 |

FOREIGN PATENT DOCUMENTS

WO   WO-2021155302 A1 *   8/2021   ......... G02B 6/29367

OTHER PUBLICATIONS

Sujith Chandran et al., "Hybrid Wavelength-Division Multiplexing Filters", filed Sep. 4, 2019 as U.S. Appl. No. 16/559,979.
(Continued)

*Primary Examiner* — Chad H Smith
(74) *Attorney, Agent, or Firm* — Thompson Hine LLP; Anthony Canale (57) ABSTRACT

Structures for a wavelength-division multiplexing filter and methods of forming a structure for a wavelength-division multiplexing filter. The structure includes a first slab having a first perimeter, a first waveguide core coupled to the first slab, and a plurality of second waveguide cores coupled to the first slab. A second slab is positioned to overlap with the first slab. The second slab includes a second perimeter and openings that are distributed inside the second perimeter. The openings of the second slab penetrate through the second slab.

20 Claims, 6 Drawing Sheets

(56) References Cited

OTHER PUBLICATIONS

Horst, et al., "Cascaded Mach-Zehnder wavelength filters in silicon photonics for low loss and flat pass-band WDM (de-)multiplexing," Opt. Express 21, 11652-11658 (2013).

T. A. Huffman, et al., "Integrated Resonators in an Ultralow Loss Si3N4/SiO2 Platform for Multifunction Applications," in IEEE Journal of Selected Topics in Quantum Electronics, vol. 24, No. 4, pp. 1-9, Jul.-Aug. 2018, Art No. 5900209, doi: 10.1109/JSTQE.2018.2818459.

Piggott, A., Lu, J., Lagoudakis, K. et al., "Inverse design and demonstration of a compact and broadband on-chip wavelength demultiplexer", Nature Photon 9, 374-377 (2015).

K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611.

M. Rakowski, et al., "45nm CMOS—Silicon Photonics Monolithic Technology (45CLO) for next-generation, low power and high speed optical interconnects," in Optical Fiber Communication Conference (OFC) 2020, OSA Technical Digest (Optical Society of America, 2020), paper T3H.3. FW5D.2.

Y. Bian, et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optical Society of America, 2020), paper.

\* cited by examiner

PERFORATED WAVELENGTH-DIVISION MULTIPLEXING FILTERS

BACKGROUND

The present invention relates to photonics chips and, more specifically, to structures for a wavelength-division multiplexing filter and methods of forming a structure for a wavelength-division multiplexing filter.

Photonics chips are used in numerous applications, such as data communication systems and data computation systems. A photonics chip monolithically integrates optical components, such as waveguides, optical switches, couplers, and modulators, and electronic components, such as field-effect transistors, into a unified platform. Among other factors, layout area, cost, and operational overhead may be reduced by the chip-level integration of both types of components on the same chip.

Wavelength-division multiplexing is a technology that multiplexes multiple data streams onto a single optical link. In a wavelength-division multiplexing scheme, a set of data streams is encoded onto optical carrier signals with a different wavelength of laser light for each data stream. These optical carrier signals of the individual data streams are then combined by a wavelength-division multiplexing filter, which has a dedicated input for the data stream of each wavelength and a single output at which the individual data streams are combined (i.e., multiplexed) into a single multi-wavelength data stream for further transport through a single optical link. At the receiver side of the optical data link, a wavelength-division multiplexing filter of the same type, but used in reverse, separates (i.e., de-multiplexes) the optical carrier signals of the individual data streams and the separated optical carrier signals may be routed to corresponding photodetectors.

A wavelength-division multiplexing filter may rely on cascaded Mach-Zehnder interferometer (MZI) modulators that are realized in a silicon-based photonics technology. Because silicon exhibits a weak electro-optic effect, Mach-Zehnder interferometer modulators are characterized by a large form factor having lengthy silicon-based phase shifters that are arranged in dual arms. Mach-Zehnder interferometer modulators are also sensitive to fabrication variations that may impact performance.

Wavelength-division multiplexing filters fabricated from silicon are sensitive to temperature drift due to the relatively high thermal optical coefficient of silicon. Silicon-based wavelength-division multiplexing filters may rely on resistive heaters in an attempt to provide thermal tuning to compensate for the temperature shift. However, the addition of resistive heaters adds complexity to not only device fabrication, but also adds complexity to device operation due to the need to control the operation of the resistive heaters. In addition, the resistive heaters require the dissipation of significant amounts of electrical power to provide the requisite heating for temperature shift control.

Improved structures for a wavelength-division multiplexing filter and methods of forming a structure for a wavelength-division multiplexing filter are needed.

SUMMARY

In an embodiment of the invention, a structure for a wavelength-division multiplexing filter is provided. The structure includes a first slab having a first perimeter, a first waveguide core coupled to the first slab, and a plurality of second waveguide cores coupled to the first slab. The structure further includes a second slab that is positioned to overlap with the first slab. The second slab includes a second perimeter and a plurality of openings distributed inside the second perimeter. The plurality of openings of the second slab penetrate through the second slab.

In an embodiment of the invention, a structure for a wavelength-division multiplexing filter is provided. The structure includes a first slab having a first perimeter, the first slab having a plurality of openings distributed inside the first perimeter. The openings of the first slab penetrate through the first slab. A first waveguide core is coupled to the first slab, and a plurality of second waveguide cores are coupled to the first slab. The structure further includes a second slab positioned to overlap with the first slab.

In an embodiment of the invention, a method of forming a structure for a wavelength-division multiplexing filter is provided. The method includes forming a first slab having a first perimeter, forming a first waveguide core coupled to the first slab, and forming a plurality of second waveguide cores coupled to the first slab. The method further includes forming a second slab that is positioned to overlap with the first slab. The second slab includes a second perimeter, the second slab has a plurality of openings distributed inside the second perimeter, and the openings of the second slab penetrate through the second slab.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
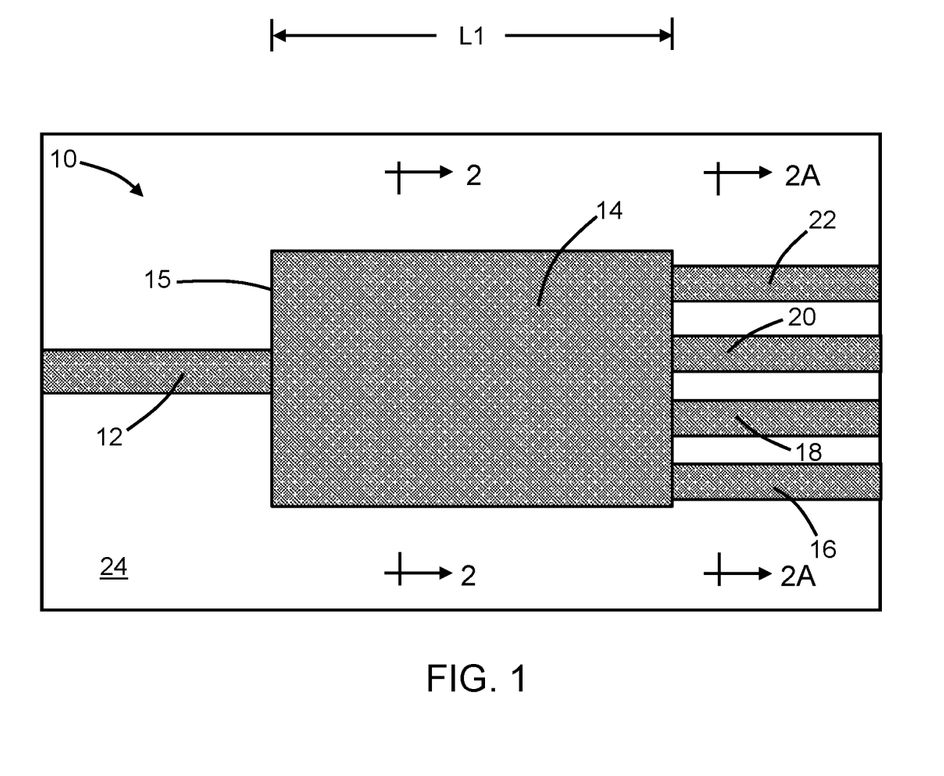
FIG. 1 is a top view of a structure at an initial fabrication stage of a processing method in accordance with embodiments of the invention.
Figure 2:
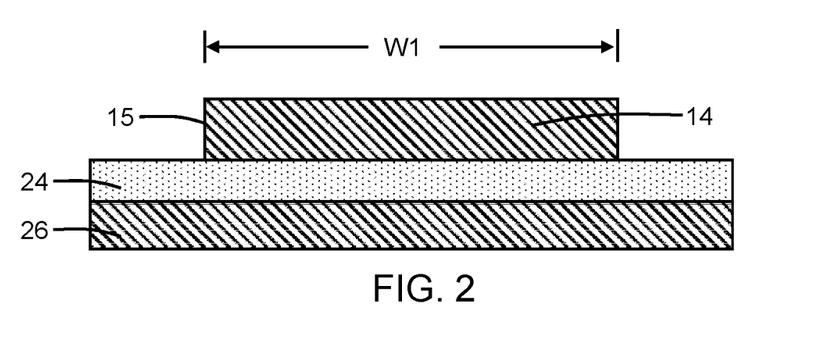
FIG. 2 is a cross-sectional view of the structure taken generally along line 2-2 in FIG. 1.
Figure 2A:
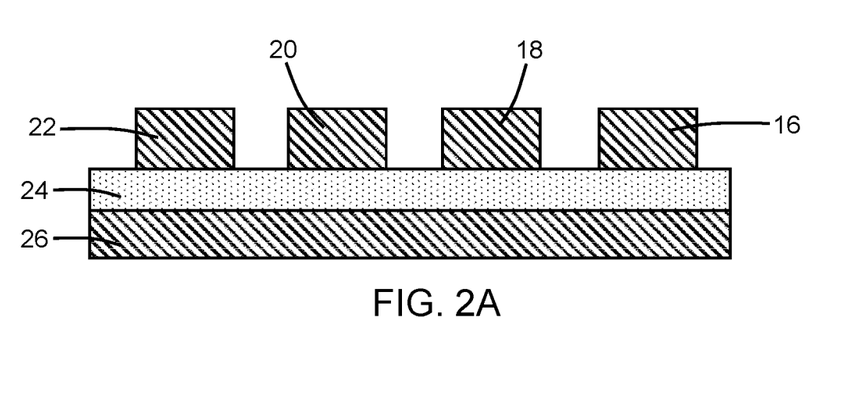
FIG. 2A is a cross-sectional view of the structure taken generally along line 2A-2A in FIG. 1.

With reference to FIGS. 1, 2, 2A and in accordance with embodiments of the invention, a structure 10 for a wavelength-division multiplexing filter includes a waveguide core 12, a slab 14, and multiple waveguide cores 16, 18, 20, 22 that are arranged over a dielectric layer 24. The waveguide core 12 provides a bus waveguide configured to guide a multiplexed data stream encoded into optical signals of multiple different wavelengths. The waveguide core 12 may provide an input port to the structure 10, and may be coupled with lasers generating the optical signals at the multiple different wavelengths. The waveguide cores 16, 18, 20, 22 provide bus waveguides configured to receive individual data streams including optical signals of different characteristic wavelengths that are demultiplexed by the structure 10. The waveguide cores 16, 18, 20, 22 may provide respective output ports or channels from the structure 10, and may be coupled with respective photodetectors. In an alternative embodiment, the structure 10 receive optical signals of different wavelengths from the waveguide cores 16, 18, 20, 22, which are combined into a multiplexed optical signal and output from the structure 10 to the waveguide core 12.

The slab 14 may be provided by a body having a perimeter 15 defining an outer boundary that surrounds a closed geometrical shape. In an embodiment, the slab 14 may be solid and imperforate. In an embodiment, the geometrical shape of the slab 14 may be a quadrilateral with a perimeter that is either rectangular or substantially rectangular. The perimeter 15 surrounds a total area of the slab 14. In an embodiment, the perimeter 15 may be dimensioned with a width W1 and a length L1, and the perimeter 13 may surround a total area given by the product of the width W1 and length L1. The waveguide core 12 may be coupled at the perimeter 15 to a portion of the slab 14, and the waveguide cores 16, 18, 20, 22 may be coupled at the perimeter 15 to respective portions of the slab 14 on an opposite side of the slab 14 from the waveguide core 12. The waveguide cores 16, 18, 20, 22 may be symmetrically arranged relative to the waveguide core 12.

The waveguide core 12, slab 14, and waveguide cores 16, 18, 20, 22 may be comprised of a single-crystal semiconductor material, such as single-crystal silicon. In an embodiment, the single-crystal semiconductor material may originate from a device layer of a silicon-on-insulator (SOI) substrate that further includes a buried oxide layer providing the dielectric layer 24 and a handle substrate 26 comprised of a single-crystal semiconductor material, such as single-crystal silicon. The waveguide core 12, slab 14, and waveguide cores 16, 18, 20, 22 may be patterned from the device layer by lithography and etching processes. The device layer may be fully etched to define the waveguide core 12, slab 14, and waveguide cores 16, 18, 20, 22 or, alternatively, only partially etched to define a thinned residual layer on the dielectric layer 24 and coupled to respective lower portions of the waveguide core 12, slab 14, and waveguide cores 16, 18, 20, 22.

Figure 3:
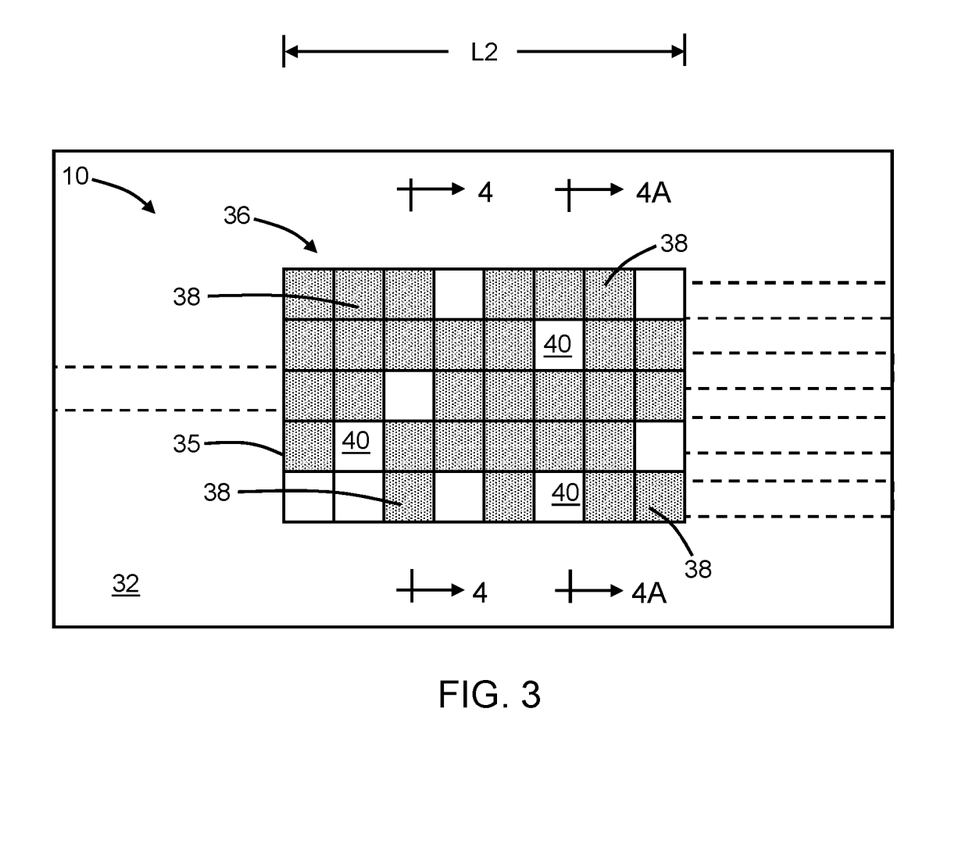
FIG. 3 is a top view of the structure at a fabrication stage subsequent to FIG. 1.
Figure 4:
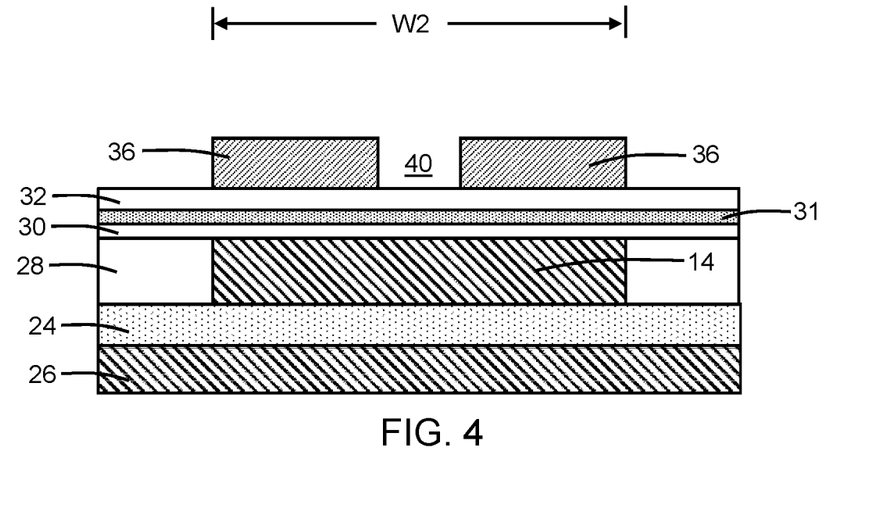
FIG. 4 is a cross-sectional view of the structure taken generally along line 4-4 in FIG. 3.
Figure 4A:
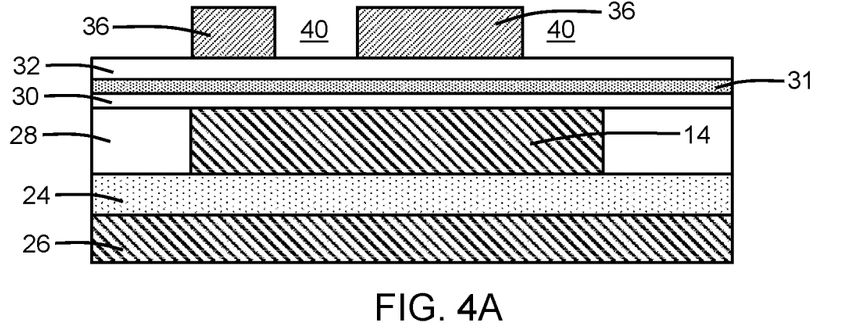
FIG. 4A is a cross-sectional view of the structure taken generally along line 4A-4A in FIG. 3.

With reference to FIGS. 3, 4, 4A in which like reference numerals refer to like features in FIGS. 1, 2, 2A and at a subsequent fabrication stage, a dielectric layer 28 is formed over the waveguide core 12, slab 14, waveguide cores 16, 18, 20, 22, and dielectric layer 24. The dielectric layer 28 may be comprised of a dielectric material, such as silicon dioxide, deposited by chemical vapor deposition and planarized with, for example, chemical-mechanical polishing to remove topography. The waveguide core 12, slab 14, and waveguide cores 16, 18, 20, 22 are surrounded by the dielectric material of the dielectric layer 28, which provides low refractive-index cladding.

Additional dielectric layers 30, 31, 32 may be deposited in a layer stack over the dielectric layer 28. The dielectric layer 32 may be comprised of silicon nitride, and the dielectric layers 30, 32 may be comprised of silicon dioxide. In an alternative embodiment, the dielectric layer 32 containing silicon nitride may be omitted from the layer stack over the dielectric layer 28.

A slab 36 is formed on the dielectric layer 32 with positioning to provide an overlap with the slab 14. In an embodiment, the slab 36 may fully overlap with the slab 14. In an embodiment, the slab 36 may be centered over the slab 14. In an embodiment, the slab 36 may be centered over the slab 14 and fully overlap with the slab 14.

The slab 36 may be provided by a body that includes blocks or segments 38 and openings 40 arranged in a design region with a pixelated pattern having positions that are assigned through a numerical computational approach. For example, the pattern of segments 38 and openings 40 may be computed using inverse design software that permits a design-by-specification approach in which requirements, such as a design area and material for the slab 36 and desired functionality in terms of optical properties and figure of merit for the structure 10, are specified, and the inverse design software finds an optimized layout for the structure 10 that meets the requirements. Design rules, such as a minimum feature size constraint, may be considered by the inverse design software to ensure that the structure 10 will be manufacturable. The grid pattern visible in FIG. 3 is shown for purposes of illustration of the division of the total area into segments 38 and openings 40 resulting from output of the inverse design software.

The slab 36 may have a perimeter 35 providing an outer boundary that surrounds the pattern of segments 38 and openings 40. In an embodiment, the general geometrical shape of the slab 36 may be a quadrilateral with a perimeter that is either rectangular or substantially rectangular. The perimeter 35 may define a design region for the slab 36. The perimeter 35 surrounds a total area of the slab 36 that is occupied by the segments 38 and openings 40. In an embodiment, the perimeter 35 may be dimensioned with a width W2 and length L2, and the perimeter 35 may surround a total area given by the product of the width W2 and length L2.

The segments 38 define solid portions of the slab 36 and the openings 40 define perforations that penetrate through the slab 36. In an embodiment, the openings 40 penetrate fully through the slab 36. The segments 38 and openings 40 are shown for purposes of illustration as rectangular with planar sides. However, the segments 38 and openings 40 may have other shapes, such as at least partially curved shapes with one or more non-planar sides. The positioning of segments 38 and openings 40 in the pattern of the slab 36 is irregular, and is determined by the design-by-specification approach implemented through the inverse design software. The segments 38 comprise a percentage of a total area of the design region and the openings 40 comprise a percentage of the total area of the design region that is not occupied by the segments 38. In an embodiment, the segments 38 may occupy a percentage of the design region that is greater than 30 percent of the total area surrounded by the perimeter 35. In an embodiment, the openings 40 may occupy a percentage of the design region that is less than or equal to 30 percent of the total area.

The slab 14 and the slab 36 are positioned in different levels of the structure 10. Specifically, the slab 36 is located in a level that is positioned in a vertical direction within a different plane from (i.e., over and above) the level of the slab 14, as well as the waveguide core 12 and the waveguide cores 16, 18, 20, 22 that are in the same level as the slab 14. The slab 36 may be formed by depositing a layer of its constituent material on the dielectric layer 32 and patterning the deposited layer with lithography and etching processes to provide the pattern of segments 38 and openings 40. In an embodiment, the slab 36 may be comprised of a material having a different composition than the material contained in the waveguide core 12. In an embodiment, the slab 36 may be comprised of a dielectric material. In an embodiment, the slab 36 may be comprised of silicon nitride. The deposited layer may be fully etched to define the slab 36 or, alternatively, only partially etched to define a thinned residual layer on the dielectric layer 32 connected to respective lower portions of the segments 38 of slab 36.

Figure 5:
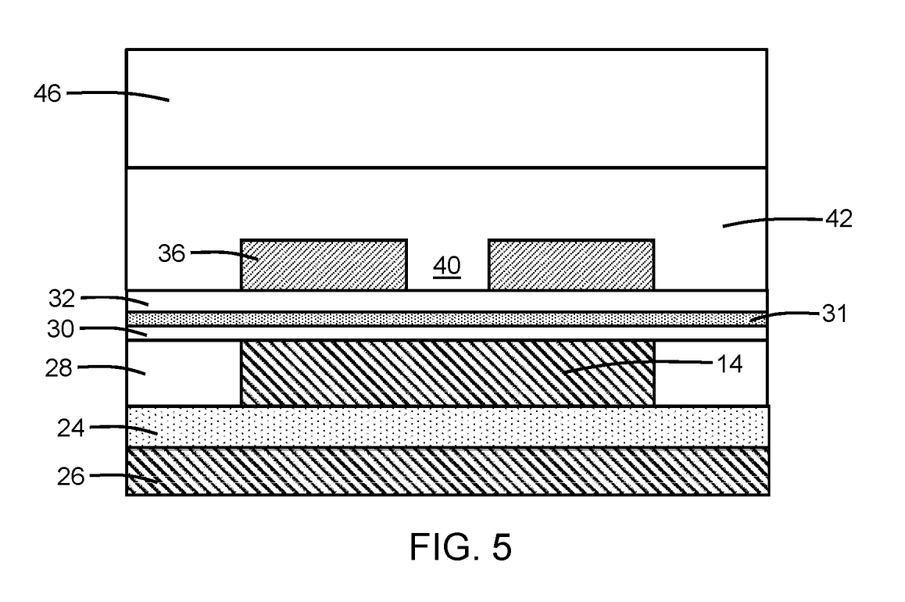
FIG. 5 is a cross-sectional view of the structure at a fabrication stage subsequent to FIG. 4.

With reference to FIG. 5 in which like reference numerals refer to like features in FIG. 4 and at a subsequent fabrication stage, a dielectric layer 42 is deposited and planarized to fill the openings 40 in the slab 36 and cover the dielectric layer 32 surrounding the slab 36. The dielectric layer 42 may be comprised of dielectric material, such as silicon dioxide, that is deposited by chemical vapor deposition using ozone and tetraethylorthosilicate (TEOS) as reactants and planarized to eliminate topography. A back-end-of-line stack 46 may be formed by back-end-of-line processing over the dielectric layer 42. The back-end-of-line stack 46 may include one or more stacked interlayer dielectric layers comprised of one or more dielectric materials, such as a silicon dioxide.

The structure 10, in any of its embodiments described herein, may be integrated into a photonics chip that may include electronic components and additional optical components in addition to the structure 10. The electronic components may include, for example, field-effect transistors that are fabricated by complementary-metal-oxide-semiconductor (CMOS) processing using the device layer of the silicon-on-insulator substrate. The back-end-of-line stack 46 may include metal lines, vias, and contacts that are connected to the field-effect transistors and electrically-active optical components.

In use, laser light containing mixed optical signals of different wavelengths may be guided on the photonics chip by the waveguide core 12 to the structure 10. The structure 10 may divide the mixed optical signals into separate optical signals of each wavelength, and the divided optical signals at each of the wavelengths may exit the structure 10 via one of the waveguide cores 16, 18, 20, 22. For example, optical signals at four wavelengths (e.g., 1271 nanometers (nm), 1291 nanometers, 1311 nanometers, 1331 nanometers) may be divided by the structure 10 such that optical signals with a 1271 nanometer wavelength are directed to the waveguide core 16, optical signals with a 1291 nanometer wavelength are directed to the waveguide core 18, optical signals with a 1311 nanometer wavelength are directed to the waveguide core 20, and optical signals with a 1331 nanometer wavelength are directed to the waveguide core 22. Use cases of the structure 10 may include standard wavelength division multiplexing (WDM), coarse wavelength division multiplexing (cWDM) having more channels that WDM, or dense wavelength division multiplexing (dWDM) having more channels than cWDM. For example, cWDM may include channels at wavelengths spaced 20 nanometers apart, compared with 0.4 nanometer spacing for dWDM.

The size reduction of the structure 10 may be significant in comparison with wavelength-division multiplexing filter may include cascaded Mach-Zehnder interferometer (MZI) modulators. For example, a rectangular design region for the slab 36 may have a width equal to about 3 microns to about 5 microns and a length equal to about 3 microns to about 5 microns, which contrasts with millimeter lengths and half-millimeter widths for a wavelength-division multiplexing filter that includes cascaded MZI modulators.

The pattern of segments 38 and openings 40 of the slab 36 are dimensioned and positioned so as not to diffract or reflect light at the wavelength of operation and act as an effective optical material, and therefore the slab 36 defines an optical metamaterial. In an embodiment, the dimensions of the segments 38 defining the optical metamaterial may be less than the smallest operating wavelength of the laser light being multiplexed or demultiplexed by the structure 10. The pattern of segments 38 and openings 40 of the slab 36 may provide performance improvements in comparison with a solid imperforate layer, such as improvements related to channel separation, 3 dB bandwidth, and extinction ratio.

The structure 10 includes a stacked arrangement of slabs containing different materials. For example, the lower slab 14 in the stacked arrangement may contain single-crystal silicon and the upper slab 36 in the stacked arrangement may contain silicon nitride. The heterogenous stacked arrangement of slabs 14, 36 may improve the confinement of transverse magnetic modes with moderate loss, which may lead to improved performance (e.g., reduced optical leakage) of the structure 10 as a wavelength-division multiplexing filter.

Figure 6:
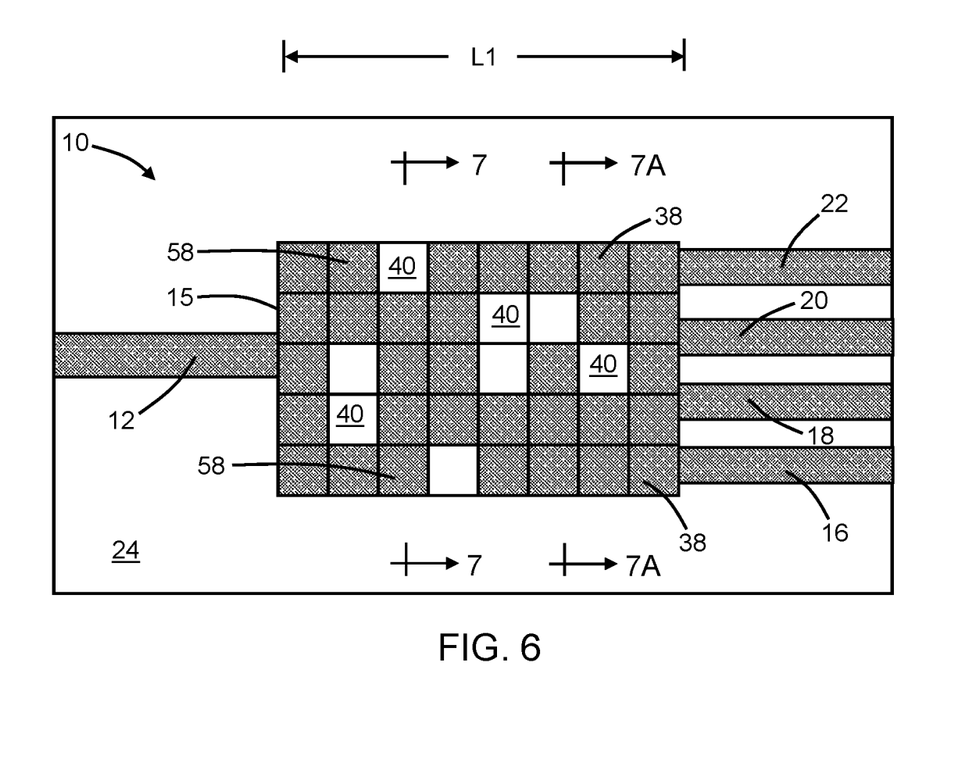
FIG. 6 is a top view of a structure in accordance with alternative embodiments of the invention.
Figure 7:
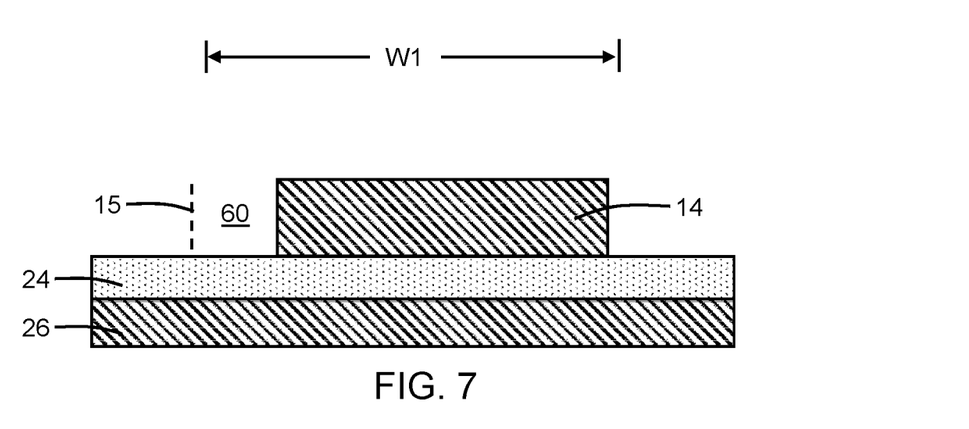
FIG. 7 is a cross-sectional view of the structure taken generally along line 7-7 in FIG. 6.
Figure 7A:
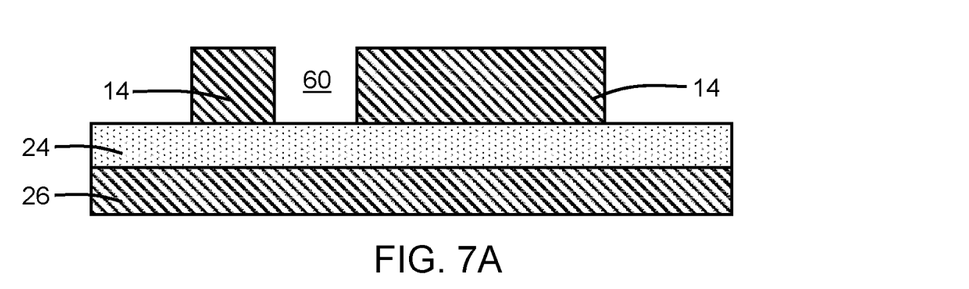
FIG. 7A is a cross-sectional view of the structure taken generally along line 7A-7A in FIG. 6.

With reference to FIGS. 6, 7, 7A and in accordance with alternative embodiments, the slab 14 may also be designed to include segments 58 and openings 60, which are similar to the pattern of segments 38 and openings 40 included in the slab 36. The segments 58 and openings 60 are arranged inside the perimeter 15 that provides the design region for the design-by-specification approach using the inverse design software. The grid pattern visible in FIG. 6 is shown for purposes of illustration of the division of the total area into segments 58 and openings 60 resulting from output of the inverse design software.

The segments 58 comprise a percentage of a total area of the design region and the openings 60 comprise a percentage of the total area of the design region that is not occupied by the segments 58. In an embodiment, the segments 58 may occupy a percentage of the design region that is greater than 20 percent of the total area surrounded by the perimeter 15. In an embodiment, the openings 60 may occupy a percentage of the design region that is less than or equal to 20 percent of the total area. The segments 58 define solid portions of the slab 14 and the openings 60 define perforations that penetrate through the slab 14. In an embodiment, the openings 60 penetrate fully through the slab 14.

In an embodiment, the slab 36 including the segments 38 and openings 40 may be formed over the slab 14 including the segments 58 and openings 60. The determination of the pattern of segments 38 and openings 40 and/or the determination of the pattern of segments 58 and openings 60 may incorporate rules governing segment overlap and opening overlap as part of the design-by-specification approach implemented through the inverse design software. The pattern of segments 58 and openings 60 included in the slab 14 may differ from the pattern of segments 38 and openings 40 included in the slab 36. In an embodiment, the location of at least one of the openings 40 may differ from the location of at least one of the openings 60. In an embodiment, the location of multiple openings 40 may differ from the location of multiple openings 60.

Figure 8:
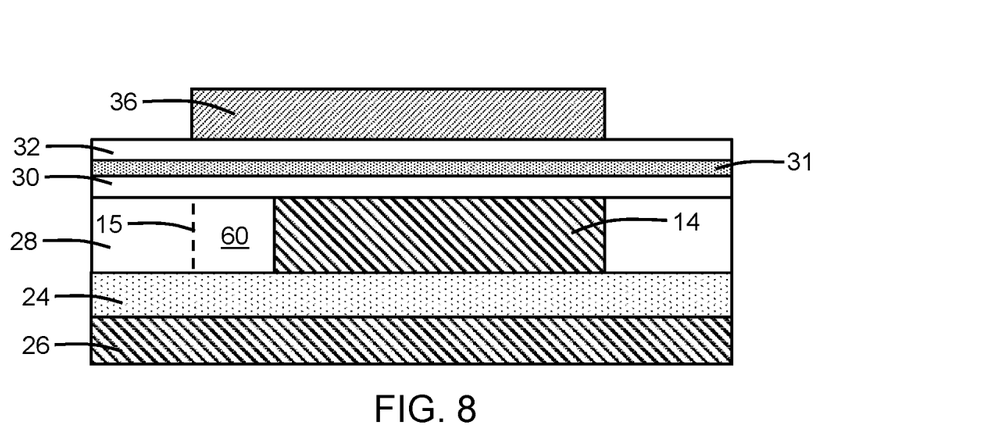
FIG. 8 is a cross-sectional view of a structure in accordance with alternative embodiments of the invention.

With reference to FIG. 8 and in accordance with alternative embodiments, the slab 36 positioned over the segments 58 and openings 60 may lack segments 38 and openings 40. Instead, the slab 36 may be provided by a body having the perimeter 35 that surrounds a solid layer and that is free of openings (i.e., imperforate). In an embodiment, the geometrical shape of the slab 36 may be a quadrilateral with a perimeter that is rectangular or substantially rectangular.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction perpendicular to the horizontal, as just defined. The term "lateral" refers to a direction within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features may overlap if a feature extends over, and covers a part of, another feature with either direct contact or indirect contact.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a wavelength-division multiplexing filter, the structure comprising:
   a substrate;
   a first slab having a first perimeter, the first slab being solid and imperforate inside the first perimeter;
   a first dielectric layer between the first slab and the substrate;
   a first waveguide core coupled to a first portion of the first slab;
   a plurality of second waveguide cores coupled to respective second portions of the first slab;
   a second slab that is positioned to overlap with the first slab, the second slab including a second perimeter that defines an outer boundary, the second slab including a plurality of openings distributed inside the second perimeter, and the plurality of openings of the second slab penetrating through the second slab; and
   a second dielectric layer positioned between the first slab and the second slab.

2. The structure of claim 1 wherein the first slab comprises single-crystal silicon, and the second slab comprises silicon nitride.

3. The structure of claim 1 wherein the plurality of openings of the second slab occupy a percentage of a total area inside the second perimeter that is less than 30 percent.

4. The structure of claim 1 wherein the second slab comprises a metamaterial.

5. The structure of claim 1 wherein the second slab includes a plurality of segments defining solid portions that are distributed along with the plurality of openings inside the second perimeter.

6. The structure of claim 5 wherein the second perimeter surrounds a total area of the second slab that is occupied by the plurality of segments and the plurality of openings.

7. The structure of claim 6 wherein the plurality of segments comprise a first percentage of the total area, the plurality of openings comprise a second percentage of the total area that is not occupied by the plurality of segments, and the first percentage is greater than the second percentage.

8. The structure of claim 5 wherein the plurality of segments and the plurality of openings are rectangular.

9. The structure of claim 5 wherein the plurality of segments and the plurality of openings are positioned in an irregular pattern.

10. A structure for a wavelength-division multiplexing filter, the structure comprising:
    a substrate;
    a first slab having a first perimeter that defines an outer boundary, the first slab having a plurality of openings distributed inside the first perimeter, and the plurality of openings of the first slab penetrating through the first slab;
    a first dielectric layer between the first slab and the substrate;
    a first waveguide core coupled to a first portion of the first slab;
    a plurality of second waveguide cores coupled to respective second portions of the first slab;
    a second slab that is positioned to overlap with the first slab, the second slab including a second perimeter, and the second slab being solid and imperforate inside the second perimeter; and
    a second dielectric layer positioned between the first slab and the second slab.

11. The structure of claim 10 wherein the plurality of openings of the first slab occupy a percentage of a total area inside the first perimeter that is less than or equal to 20 percent.

12. The structure of claim 11 wherein the first slab comprises single-crystal silicon, and the second slab comprises silicon nitride.

13. The structure of claim 10 wherein the first slab comprises a metamaterial.

14. The structure of claim 10 wherein the first slab includes a plurality of segments defining solid portions that are distributed along with the plurality of openings inside the first perimeter.

15. The structure of claim 14 wherein the first perimeter surrounds a total area of the second slab that is occupied by the plurality of segments and the plurality of openings.

16. The structure of claim 15 wherein the plurality of segments comprise a first percentage of the total area, the plurality of openings comprise a second percentage of the total area that is not occupied by the plurality of segments, and the first percentage is greater than the second percentage.

17. The structure of claim 14 wherein the plurality of segments and the plurality of openings are rectangular.

18. The structure of claim 14 wherein the plurality of segments and the plurality of openings are positioned in an irregular pattern.

19. A method of forming a structure for a wavelength-division multiplexing filter, the method comprising:

forming a first slab having a first perimeter, wherein the first slab is solid and imperforate, and a first dielectric layer is positioned between the first slab and a substrate;

forming a first waveguide core coupled to a first portion of the first slab;

forming a plurality of second waveguide cores coupled to respective second portions of the first slab;

forming a second slab that is positioned to overlap with the first slab and that includes a plurality of openings distributed inside a second perimeter of the second slab and penetrating through the second slab, wherein the second perimeter defines an outer boundary of the second slab; and forming a second dielectric layer, wherein the second dielectric layer is positioned between the first slab and the second slab.

20. The method of claim 19 wherein the second slab is formed by a design-by-specification approach using inverse design software.

* * * * *